(12) United States Patent
Hogg et al.

(10) Patent No.: US 8,938,714 B2
(45) Date of Patent: Jan. 20, 2015

(54) SPECIFYING REUSABLE PROCESS MODELS

(75) Inventors: Kerard Hogg, Riddells Creek (AU);
Abhinay R. Nagpal, Maharashtra (IN);
Sandeep R. Patil, Elmsford, NY (US);
Manisha K. Sharma, New Delhi (IN);
Gandhi Sivakumar, Victoria (AU);
Vijayaganesh Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 13/280,697

(22) Filed: Oct. 25, 2011

(65) Prior Publication Data
US 2013/0103372 A1    Apr. 25, 2013

(51) Int. Cl.
G06F 9/44 (2006.01)
G06G 7/48 (2006.01)
G06Q 10/06 (2012.01)

(52) U.S. Cl.
CPC .. *G06G 7/48* (2013.01); *G06F 8/34* (2013.01);
*G06F 8/20* (2013.01); *G06F 8/35* (2013.01);
*G06F 8/10* (2013.01); *G06F 8/36* (2013.01);
*G06F 8/355* (2013.01); *G06Q 10/06* (2013.01)
USPC ............ 717/110; 717/102; 717/105; 717/113

(58) Field of Classification Search
CPC ............... G06F 8/00; G06F 8/10; G06F 8/20;
G06F 8/22; G06F 8/24; G06F 8/34; G06F
8/35; G06F 8/355; G06F 8/36; G06F 8/74;
G06F 8/75; G06F 8/751

USPC .................................................. 717/100–113
See application file for complete search history.

(56) References Cited

U.S. PATENT DOCUMENTS 7,472,374 B1 * 12/2008 Dillman et al. ............... 717/102
7,957,992 B2 * 6/2011 Gilbert et al. ................ 705/7.38
(Continued)

OTHER PUBLICATIONS

Schnieders, Arnd and Puhlmann, Frank. Variability Mechanisms in E-Business Process Families. Hasso-Plattner-Institute for IT Systems Engineering at the University of Potsdam, 2006. Last retrieved from http://www.frapu.de/pdf/BIS2006-PESOA.pdf on Sep. 5, 2014.*

(Continued)

*Primary Examiner* — Wei Zhen
*Assistant Examiner* — Andrew M Lyons
(74) *Attorney, Agent, or Firm* — Schmeiser, Olsen & Watts; John Pivnichny

(57) ABSTRACT

A method and system for specifying a reusable process model. Sub-processes of a base process are identified as having a potential to be modified. By filling in values in a configurable pattern applied to each identified sub-process, dynamic categories are mapped to the identified sub-processes, thereby allowing the sub-processes to be reusable. A change to business requirements occurs, where the base process is based on the business requirements. Based on the change to the business requirements, a change to the values in the configurable pattern applied to a sub-process is received. The change to the values in the configurable pattern does not require a change to the base process.

20 Claims, 10 Drawing Sheets

(56) References Cited

U.S. PATENT DOCUMENTS

| | | | |
|---|---|---|---|
| 8,015,541 B1* | 9/2011 | Srinivasan et al. | 717/104 |
| 8,386,996 B2* | 2/2013 | Prigge et al. | 717/104 |
| 8,463,634 B2* | 6/2013 | Kulkarni et al. | 705/7.12 |
| 2004/0176968 A1 | 9/2004 | Syed et al. | |
| 2007/0265900 A1* | 11/2007 | Moore | 705/8 |
| 2009/0281777 A1 | 11/2009 | Baeuerle et al. | |
| 2011/0029983 A1* | 2/2011 | Lu et al. | 718/105 |
| 2012/0030573 A1* | 2/2012 | Balko et al. | 715/735 |
| 2013/0085799 A1* | 4/2013 | Zhang et al. | 705/7.26 |

OTHER PUBLICATIONS

Hallerbach et al., Capturing Variability in Business Process Models: The Provop Apporach, Journal of Software Maintenance and Evolution, v 22, n 6-7, Oct. 2010, ISSN: 1532060X, 29 pages.

Hallerbach et al., Context-based Configuration of Process Variants, 3rd International Workshop on Technologies for Context-Aware Business Process Management (TCoB 2008), Jun. 28, Barcelona Spain, 11 pages.

* cited by examiner

900

| DSL Modem | |
|---|---|
| Category value attributes | |

Type

○ Simple

Process invoked   | <select and specify a global sub-process here> | Browse |

◉ Hierarchical

| Type Name | Process Invoked | |
|---|---|---|
| Main modem | <select and specify a global sub-process here> | Browse |
| Modem spares | | |

*FIG. 9*

SPECIFYING REUSABLE PROCESS MODELS

TECHNICAL FIELD

The present invention relates to a data processing method and system for specifying a process model, and more particularly to a technique for specifying a reusable process model in a service-oriented architecture environment.

BACKGROUND

Software factory models rely on a quick assembly of components using mix and match of "off the shelf" components for a new business requirement. A business process that eventually results in a service component needs to absorb the changes in business requirements even if the business process is conformant to industry standards (e.g., enhanced Telecommunications Operations Map (eTOM)). For example, a process designed to "Activate a Customer Order" may have a need for a sub-process to reserve a resource of a type "Modem." Subsequently, there may be a requirement to invoke another sub-process to reserve a resource of the type "Modem spares." The designer appends the new sub-process for the type "Modem spares" to the existing process.

BRIEF SUMMARY

Embodiments of the present invention provide a method of specifying a reusable process model. The method comprises the steps of:
a computer receiving an indication that one or more sub-processes of a base process have a potential for being modified;
based on the received indication that the one or more sub-processes of the base process have the potential for being modified, the computer applying a corresponding configurable pattern to each sub-process, wherein applying the corresponding configurable pattern includes applying a configurable pattern to a sub-process of the one or more sub-processes;
the computer filling in the configurable pattern with values that indicate a mapping of one or more dynamic categories to the sub-process, wherein the mapping is included in a business context;
the computer receiving an indication of a change to business requirements on which the base process is based; and
based on the received indication of the change to the business requirements, the computer receiving a change to the values filled in the configurable pattern without requiring a change to the base process.

A system, program product and a process for supporting computing infrastructure where the process provides at least one support service are also described and claimed herein, where the system, program product and process for supporting computing infrastructure correspond to the aforementioned method.

Embodiments of the present invention provide enhanced process model options that introduce flexibility to process elements by abstracting the process or sub-process through pre-defined patterns. The enhanced process model options allow the creation of highly flexible process models that accommodate future changes in business requirements without requiring a change to a baseline process. The highly flexible process models provide quick turnaround time in realizing information technology (IT) components, which is especially desirable in IT Factory models.

BRIEF DESCRIPTION OF THE DRAWINGS

FIG. 9 depicts an interface for defining dynamic categories and their attributes for use in the process of FIG. 2 applied to the exemplary process flow of FIG. 4, in accordance with embodiments of the present invention.

DETAILED DESCRIPTION

Overview

Figure 1:
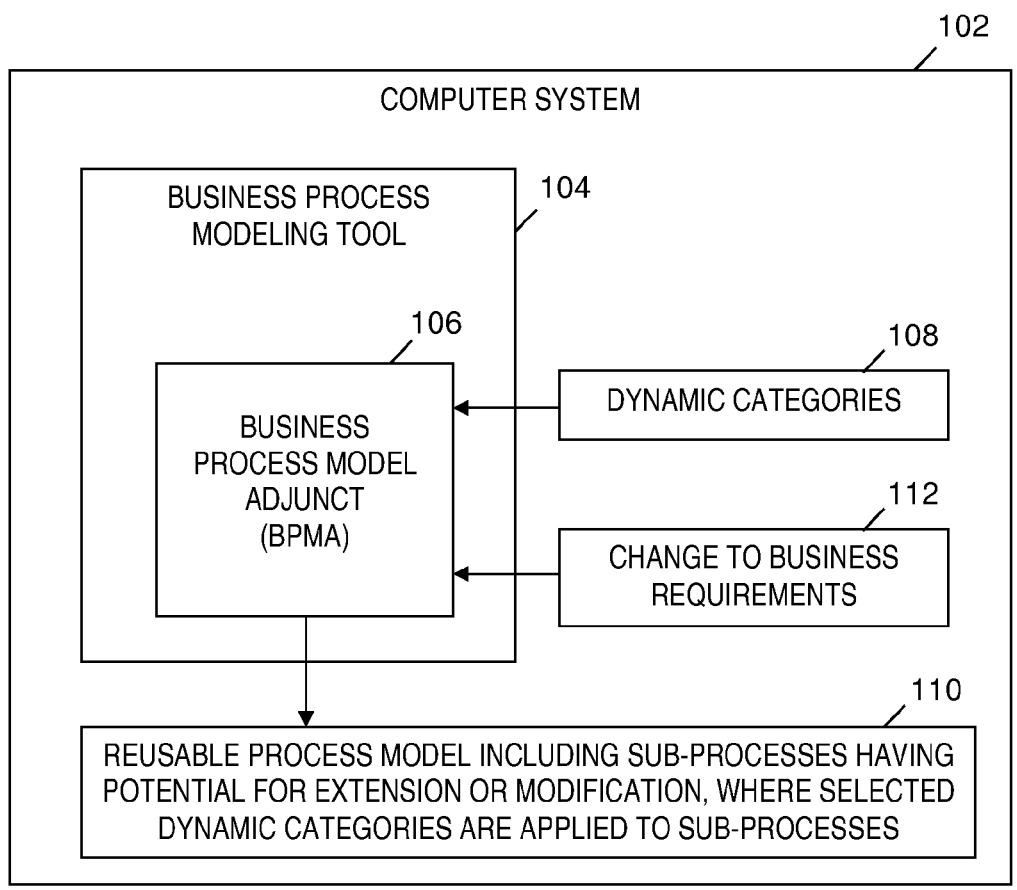
FIG. 1 is a block diagram of a system for specifying a reusable process model, in accordance with embodiments of the present invention.

The present invention recognizes the rigidity of current methods of modeling processes in which process models require new versions of process models in response to the introduction of new business requirements (e.g., to address a new requirement to invoke a new sub-process, a designer must modify an existing process model by appending the new sub-process to the existing process model, thereby creating a need to release a new version of the process model).

Further, the present invention recognizes that current offerings that model decision points or rules of a process as enterprise level business policies provide a certain type of flexibility by being configurable at runtime. The flexibility provided during runtime in terms of selecting a service end point based on certain policies, however, does not provide flexibility in the business logic of a process that allows a process author to accommodate future changes without changing the base (a.k.a. baseline or skeletal) process during the modeling phase.

Embodiments of the present invention may provide a method and system for specifying a reusable process model by allowing a process author to perform variation analysis of the process elements (i.e., determine how frequently the process elements can change and what kinds of changes the process elements can undergo), identify the process elements (e.g., sub-processes) that are likely to undergo variation, and apply flexible modeling primitives (i.e., pre-defined structures (a.k.a. patterns)) including hierarchical patterns to the identified process components. The flexible modeling primitives may include a specification of reusable dynamic categories of sub-processes of the process model and a specification of types of the dynamic categories. By applying the modeling primitives, a process author has an option to provide abstraction to processes and sub-processes of the process model, thereby providing flexibility to absorb future changes. The resulting flexible model elements support future changes without requiring a change to the base process during the modeling phase. The sub-processes to which the modeling primitives are applied are independent processes themselves and are globally available as reusable entities (i.e., available to be reused in the specification of one or more other process models). In one embodiment, a guided wizard feature guides the process author by identifying appropriate locations to position the flexible modeling primitives.

Embodiments of the present invention enable a process author to define a minimal abstract element of a sub-process of a complex process so that the minimal abstract element can be enriched later.

Embodiments of the present invention provide a highly abstract process model that has abstract elements driven by the context of the process. Depending on the context, the elements of the process are excluded or are invoked in the appropriate sequence. As used herein, context of a process is required for the overall behavior of the process and its elements, including exclusions and sequence changes, and is different from context specific to an object-oriented model that is specific to a particular object only and is static.

Even with minimal business visibility, the process model disclosed herein is able to absorb the changing needs of a business. The process driven by its context enables the modelled process to be depicted statically.

The base process models disclosed herein are well-defined and complete. Embodiments of the present invention generate a configuration of process variants of a base process during design or modelling time (not at runtime). In one embodiment, the configuration of process variants is modified during the modelling phase only. The context to generate the process variants of a base process is provided in the Category and Category type attributes of a sub-process.

Embodiments of the present invention allow a process author to call the same process multiple times with a changed context, or specify a new and completely different global sub-process to be invoked with a changing business context.

Embodiments of the present invention provide a proactive approach that includes abstracting the process elements and performing an internal or underlying mapping to context behavior. Abstract parts of the business process are identified and are internally mapped to the relevant process elements or sub-processes, depending on the context, without strongly typing the related tasks and sub-processes for the defined context. Process authors have the flexibility to change the sub-processes.

Embodiments of the present invention provide sub-processes that are independent entities, with no direct linkage to the base process. Any change in the base process will have no impact on the sub-processes.

Embodiments of the present invention provide flexibility at the process and sub-process level (rather than at the service level), thereby allowing sub-processes to be added, deleted and modified by using attributes (i.e., category, type, and mapping between category and sub-process) of the process itself.

As one example, a process model pre-fabricated with the flexible modeling primitives disclosed herein can be exported as a Business Process Execution Language (BPEL) process, and further processed for static behavior in tools such as WebSphere® Integration Developer (WID) and invoked in run-time environments such as WebSphere® Process Server. WebSphere® Integration Developer and WebSphere® Process Server are offered by International Business Machines Corporation located in Armonk, N.Y.

As used herein, a process author (a.k.a. process owner) is defined as a person who models a process using a modeling tool (e.g., WebSphere® Business Modeler offered by International Business Machines Corporation). The method and system disclosed herein empowers the process author to have flexibility to introduce more sub-processes to a base process without having to change the base process itself.

System for Specifying a Reusable Process Model

FIG. 1 is a block diagram of a system for specifying a reusable process model, in accordance with embodiments of the present invention. Computer system 102 runs a software-based business process modeling tool 104, which includes a business process model adjunct (BPMA) 106. BPMA 106 receives a catalog of dynamic categories 108 and generates a reusable process model 110. Process model 110 includes sub-processes of a base process, where the sub-processes are indicated as having a likelihood for an extension or a modification in the future. For each sub-process in process model 110 having a likelihood for an extension or modification, process model 110 includes mapping(s) of one or more dynamic categories to the sub-process. Based on a change 112 to business requirements on which the process model 110 is based, BPMA 108 changes one or more dynamic categories and identifiers of the sub-process(es) corresponding to the changed one or more dynamic categories without requiring any change to the base process.

The functionality of the components of computer system 102 is further described in the discussions presented below relative to FIG. 2 and FIG. 10.

Process for Specifying a Reusable Process Model

Figure 2:
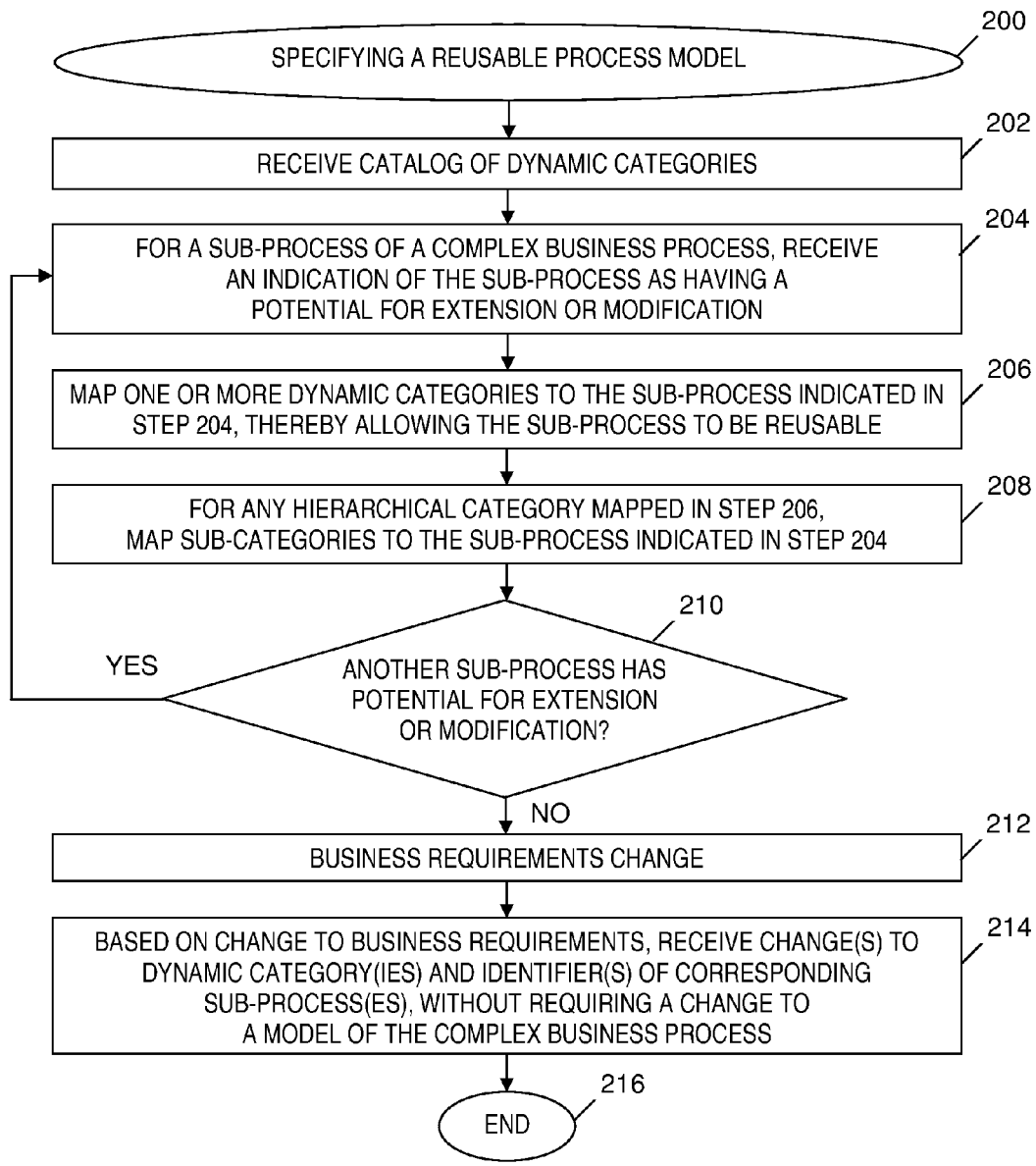
FIG. 2 is a flowchart of a process of specifying a reusable process model, where the process is implemented in the system of FIG. 1, in accordance with embodiments of the present invention.

FIG. 2 is a flowchart of a process of specifying a reusable process model, where the process is implemented in the system of FIG. 1, in accordance with embodiments of the present invention. The process for specifying a reusable process model starts at step 200. In step 202, BPMA 106 (see FIG. 1) receives a catalog of dynamic categories 108 (see FIG. 1).

In step 204, for a sub-process of a base process (i.e., complex business process), BPMA 106 (see FIG. 1) receives an indication that the sub-process has a potential (i.e., a likelihood based on pre-defined criteria) for an extension or a modification.

In step 206, BPMA 106 (see FIG. 1) receives attributes of each dynamic category, where the received attributes include a mapping of one or more of dynamic categories 108 (see FIG. 1) to the sub-process indicated in step 204 and further include the type of each dynamic category (i.e., simple or hierarchical). The attributes received in step 206 allows the sub-process indicated in step 204 to be reusable as a sub-process in specifying another reusable process model. For a dynamic category of type simple, BPMA 106 (see FIG. 1) specifies exactly one sub-process that needs to be mapped to the dynamic category. For a dynamic category of type hierarchical, BPMA 106 (see FIG. 1) specifies multiple business contexts and sub-processes associated with the specified business contexts in a one-to-one correspondence.

The dynamic categories 108 (see FIG. 1) mapped in step 206 are reusable for one or more other sub-processes (i.e. each dynamic category can be mapped to one sub-process and subsequently can be mapped to another sub-process). For example, a category in a DSL resources category catalog is mapped in step 206 to an Allocate Resources sub-process. Subsequently, the same category in the DSL resources category catalog is mapped to another sub-process, which is different from the Allocate Resources sub-process.

In step 208, for any dynamic category whose mapping is received in step 206 that is a dynamic category of type hierarchical, BPMA 106 (see FIG. 1) receives mappings of sub-categories to the sub-process indicated in step 204.

In step 210, a user of tool 104 (see FIG. 1) determines whether another sub-process of the base process has a potential for an extension or a modification. If step 210 determines that there is a next sub-process having a potential for an extension or a modification, then the Yes branch of step 210 is followed and a next iteration of a loop begins at step 204, with BPMA 106 (see FIG. 1) receiving an indication that the next sub-process has the potential for an extension or a modification.

Returning to step 210, if the user of tool 104 (see FIG. 1) determines that there is not another sub-process of the base process that has a potential for an extension or a modification, then the No branch of step 210 is followed and step 212 is performed.

In step 212, a change 112 (see FIG. 1) to business requirements is detected or received by a user of tool 104 (see FIG. 1). The base process is based on the business requirements that change. In one embodiment, BPMA 106 (see FIG. 1) receives an indication that the business requirements have changed. A user of tool 104 (see FIG. 1) changes one or more dynamic categories of dynamic categories 108 (see FIG. 1) and changes identifier(s) of sub-process(es) to which the one or more changed dynamic categories are mapped.

In step 214, based on the change to the business requirements, BPMA 106 (see FIG. 1) receives the changes to the one or more dynamic categories and the changes to the identifier(s) of the sub-process(es) to which the one or more changed dynamic categories are mapped, and changes the values of novel modeling primitives of process model 110 (see FIG. 1) based on the received changes to the dynamic category(ies) and sub-process identifier(s). Although the business requirements changed in step 212, the changes to the values of the modeling primitives of process model 110 (see FIG. 1) provide the reusability of process model 110 (see FIG. 1) and the reusability of the sub-processes, and do not require any change to the base process.

Although not shown in FIG. 2, business requirements may change repeatedly and the process of FIG. 2 may loop one or more times through steps 212 and 214, thereby again demonstrating the reusability of process model 110 (see FIG. 1).

After the final performance of step 214, the process of FIG. 2 ends with step 216.

EXAMPLES

Figure 3:
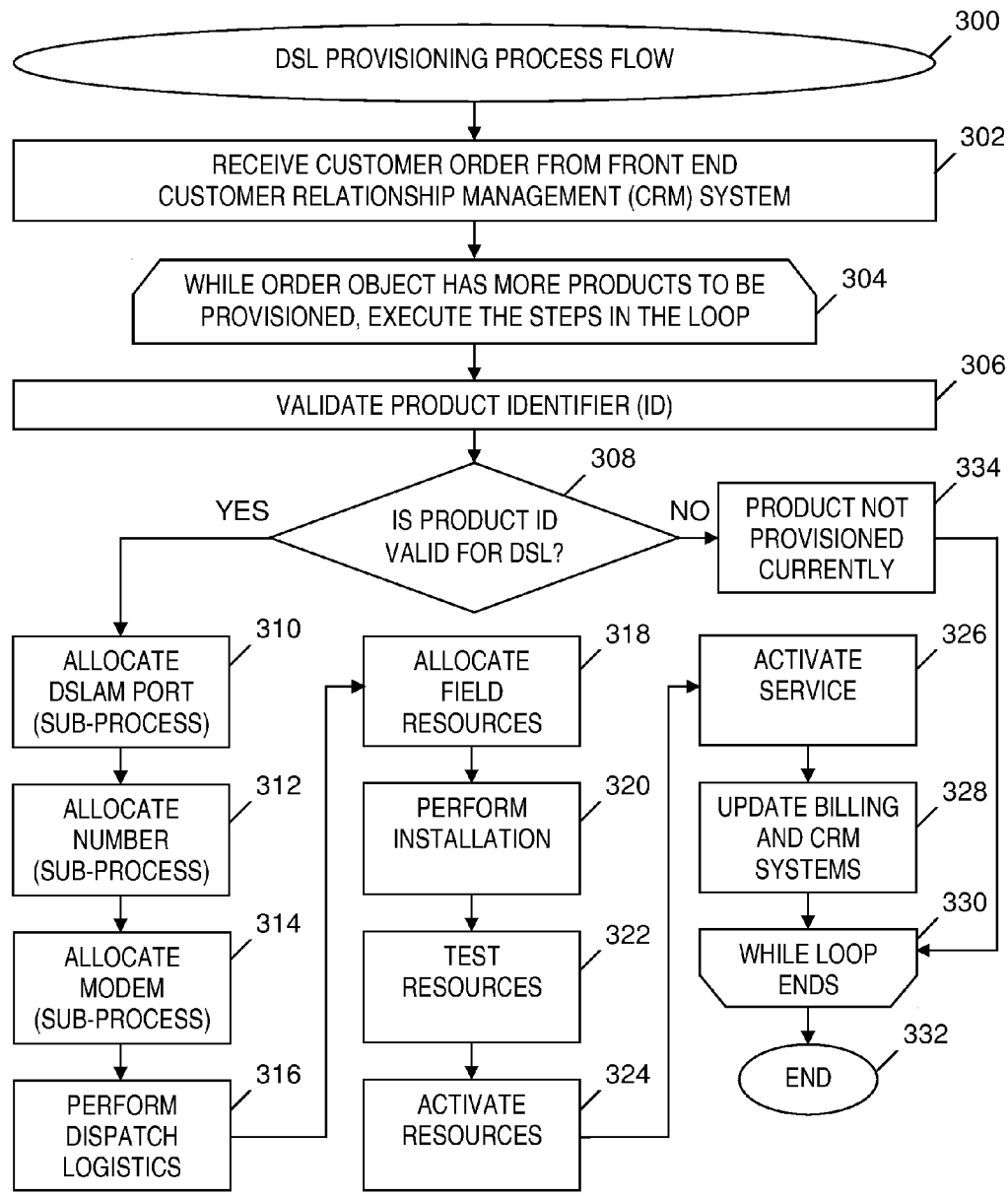
FIG. 3 is an exemplary process flow for provisioning a digital subscriber line (DSL) service, where the process flow is modified as shown in FIG. 4, and where the process flows of FIG. 3 and FIG. 4 may be improved by the process of FIG. 2, in accordance with embodiments of the present invention.
Figure 4:
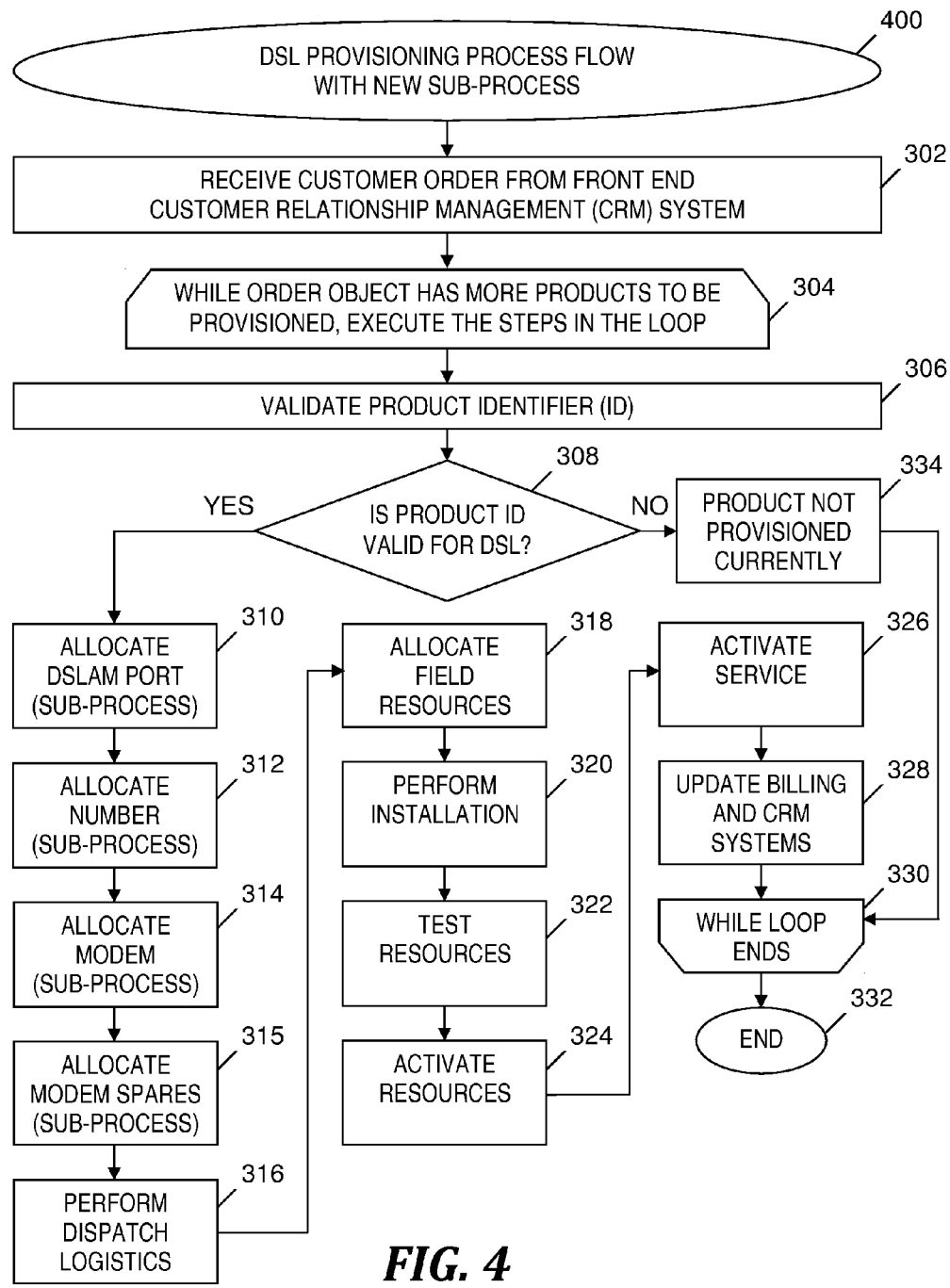
FIG. 4 is an exemplary process flow for provisioning a DSL service, where the process flow is a modification of the process flow of FIG. 3, and where the process flows of FIG. 3 and FIG. 4 may be improved by the process of FIG. 2, in accordance with embodiments of the present invention.

FIG. 3 is an exemplary process flow for provisioning a digital subscriber line (DSL) service, where the process flow is modified as shown in FIG. 4, and where the process flows of FIG. 3 and FIG. 4 may be improved by the process of FIG. 2, in accordance with embodiments of the present invention. FIG. 3 depicts a process flow of a telecommunications order provisioning system in which an order is captured from a customer. The order may be for multiple products, but the example in FIG. 3 focuses on the fulfillment of an order for DSL service as a product. It should be noted that FIG. 3 depicts elements of the process flow as examples only; in an actual process flow for DSL provisioning, there may be multiple sub-processes, tasks, etc. The exemplary process flow of FIG. 3 starts at step 300.

In step 302, the provisioning system receives a customer order from a front end customer relationship management (CRM) system.

In step 304, a while loop begins so that while an order object being processed by the provisioning system has one or more products to be provisioned, the steps through the end of the while loop at step 330 are performed.

In step 306, the provisioning system validates a product identifier (ID) of a product included in the order object being processed by the provisioning system.

In step 308, the provisioning system determines whether the product ID is valid for DSL provisioning. If the provisioning system determines in step 308 that the product ID is valid, then the Yes branch of step 308 is followed and step 310 is performed.

In step 310, the provisioning system performs a sub-process that allocates a Digital Subscriber Line Access Multiplexer (DSLAM) port for the DSL service being provisioned.

In step 312, the provisioning system performs a sub-process that allocates a telephone number for a telephone provided as part of the DSL service being provisioned.

In step 314, the provisioning system performs a sub-process that allocates a modem to the DSL service being provisioned. The customer is able to connect to the DSL service provider's network through the modem that is allocated.

In step 316, the provisioning system performs dispatch logistics for the DSL service being provisioned.

In step 318, the provisioning system allocates field resources for the DSL service being provisioned.

In step 320, the provisioning system performs the installation of the DSL service being provisioned.

In step 322, the provisioning system tests resources for the DSL service being provisioned.

In step 324, the provisioning system activates resources for the DSL service being provisioned.

In step 326, the provisioning system activates the DSL service.

In step 328, the provisioning system updates a billing system to include the activated DSL service and updates the CRM system to indicate that the order for the DSL service is fulfilled.

After step 328, the loop beginning at step 304 iterates again if there is another product in the order object that needs to be provisioned. In step 330, the while loop that began at step 304 ends. Following the end of the while loop, the process of FIG. 3 ends at step 332.

Returning to step 308, if the provisioning system determines that the product ID is not valid for DSL provisioning, then the No branch of step 308 is followed and step 334 is performed.

In step 334, the provisioning system does not currently provision the product. Following step 334, the loop beginning at step 304 iterates again if there is another product in the order object that needs to be provisioned. In step 330, the while loop ends and the process of FIG. 3 ends at step 332.

FIG. 4 is an exemplary process flow for provisioning a DSL service, where the process flow is a modification of the process flow of FIG. 3, and where the process flows of FIG. 3 and FIG. 4 may be improved by the process of FIG. 2, in accordance with embodiments of the present invention. In FIG. 3, the current business requirements indicate a need to allocate the DSLAM port, the telephone number and the modem only. Within a few weeks, the business requirements change as the business decides to include modem spare parts together with the modems to be dispatched to the customer as part of the provisioning process. Because there is no flexibility in the process model of FIG. 3 to absorb the change in the business requirements with the process model remaining as is, the process author needs to modify the process model of FIG. 3 by introducing an additional sub-process as shown in FIG. 4. Because the additional sub-process is introduced in FIG. 4, a new version of the process model needs to be released.

The exemplary process flow of FIG. 4 starts at step 400. Steps 302, 304, 306, 308, 310, 312 and 314 are described above relative to the discussion of FIG. 3. In step 315, the provisioning system performs the additional sub-process that allocates the modem spares.

Steps 316, 318, 320, 322, 324, 326, 328, 330, 332 and 334 are described above relative to the discussion of FIG. 3.

Figure 5:
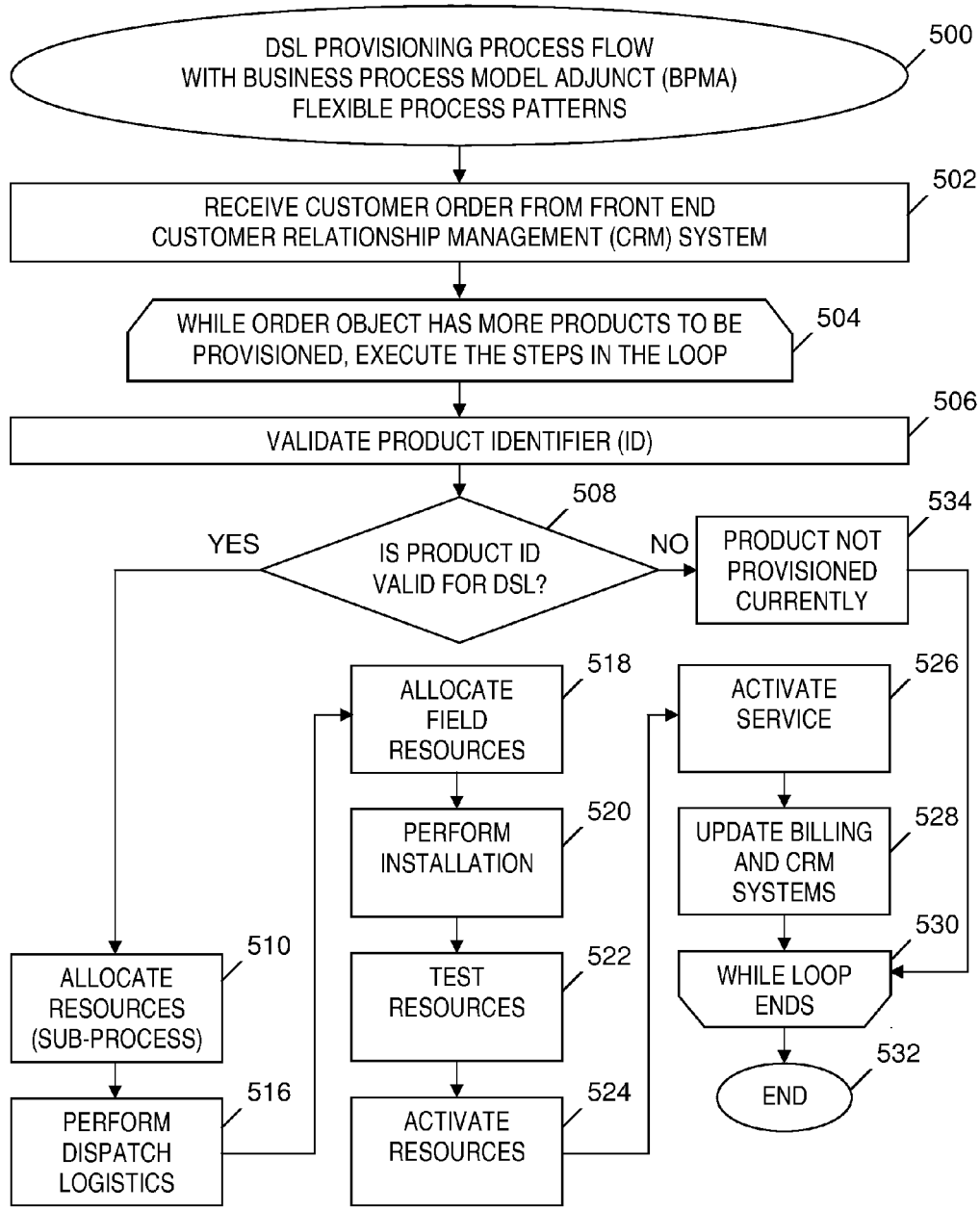
FIG. 5 is an exemplary process flow for provisioning a DSL service, where the process flow is implemented by the process of FIG. 2 applied to the process flow of FIG. 3 or FIG. 4, in accordance with embodiments of the present invention.

FIG. 5 is an exemplary process flow for provisioning a DSL service, where the process flow is implemented by the process of FIG. 2 applied to the process flow of FIG. 3 or FIG. 4, in accordance with embodiments of the present invention.

Instead of the process flow of FIG. 4 being the modification of the process flow of FIG. 3, BPMA 106 (see FIG. 1) enables the process author to fit in appropriate patterns at various sub-process levels as shown in FIG. 5. The process author applies a configurable dynamic category pattern to one or more sub-processes within a base process, where the one or more sub-processes have been determined to be potential candidates for frequent changes in the future.

A change that is determined to be likely for a sub-process of the base process may include:

- Invoking the "same" sub-process for a new business context in addition to the existing one. For example, the same sub-process "Allocate Modem" (see step 314 in FIGS. 3 and 4) is invoked for Modem Spares (i.e., the new business requirement for allocating modem spare parts), in addition to invoking "Allocate Modem" for the main Modem (i.e., the existing business requirement for allocating the modem).
- Invoking a "new" sub-process for the same business context instead of the existing one. For example, in the scenario discussed above, the business logic of the "Allocate Modem" sub-process itself has changed (e.g., the changed business logic gives the customer an option to choose the modem vendor instead of supplying a default modem). In this case, the business context is still the allocation of a "modem," but the original "Allocate Modem" sub-process is replaced with the new version of the sub-process.
- Invoking a "new" sub-process for a new business context instead of the existing one. For example, in addition to the main Modem, Modem Spares is allocated also, and the sub-process that allocates modem spares is different from the "Allocate Modem" sub-process. Therefore, in this case, a new business context is introduced, which is the allocation of "Modem Spares," which is mapped to the new sub-process that is defined for the new business context.

FIG. 5 illustrates how BPMA 106 (see FIG. 1) provides the flexible process patterns that address a change in the business requirements for the example of DSL provisioning. The process of FIG. 5 starts at step 500.

In step 502, the provisioning system receives a customer order from a front end CRM system.

In step 504, a while loop begins so that while an order object being processed by the provisioning system has one or more products to be provisioned, the steps through the end of the while loop at step 530 are performed.

In step 506, the provisioning system validates a product ID of a product included in the order object being processed by the provisioning system.

In step 508, the provisioning system determines whether the product ID is valid for DSL provisioning. If the provisioning system determines that the product ID is valid, then the Yes branch of step 508 is followed and step 510 is performed.

In step 510, the provisioning system performs a sub-process that allocates resources for the DSL service being provisioned. BPMA 106 (see FIG. 1) provides the following dynamic categories for the sub-process performed in step 510:

- DSLAM Port—mapped to the Allocate DSLAM Port sub-process of the base process
- Number—mapped to the Allocate Number sub-process of the base process
- Modem—mapped to the Allocate Modem sub-process of the base process BPMA 106 (see FIG. 1) provides dynamic categories that are of type simple or hierarchical. The dynamic category Modem may be hierarchical and have the following sub-categories:

- Modem—mapped to the Allocate Modem sub-process
- Modem Spares—mapped to the Allocate Modem Spares sub-process In step 516, the provisioning system performs dispatch logistics for the DSL service being provisioned.

In step 518, the provisioning system allocates field resources for the DSL service being provisioned.

In step 520, the provisioning system performs the installation of the DSL service being provisioned.

In step 522, the provisioning system tests resources for the DSL service being provisioned.

In step 524, the provisioning system activates resources for the DSL service being provisioned.

In step 526, the provisioning system activates the DSL service.

In step 528, the provisioning system updates a billing system to include the activated DSL service and updates the CRM system to indicate that the order for the DSL service is fulfilled.

After step 528, the loop beginning at step 504 iterates again if there is another product in the order object that needs to be provisioned. In step 530, the while loop that began at step 504 ends. Following the end of the while loop, the process of FIG. 5 ends at step 532.

Returning to step 508, if the provisioning system determines that the product ID is not valid for DSL provisioning, then the No branch of step 508 is followed and step 534 is performed.

In step 534, the provisioning system does not currently provision the product. Following step 534, the loop beginning at step 504 iterates again if there is another product in the order object that needs to be provisioned. In step 530, the while loop ends and the process of FIG. 5 ends at step 532.

Figure 6:
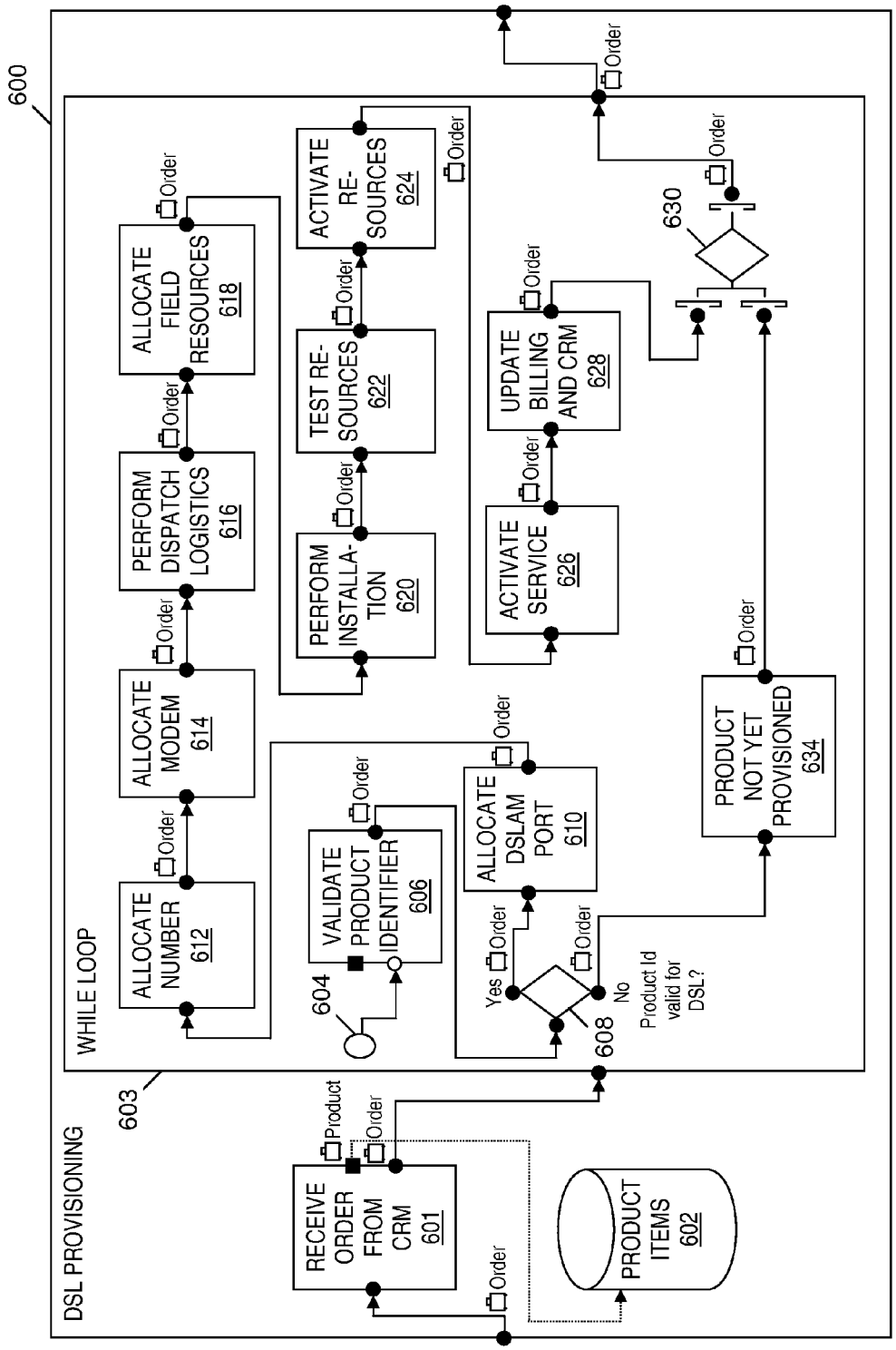
FIG. 6 depicts an exemplary display of a modeling tool that models the DSL provisioning process flow of FIG. 3 before implementing the process of FIG. 2, in accordance with embodiments of the present invention.

FIG. 6 depicts an exemplary display of a modeling tool that models the DSL provisioning process flow of FIG. 3 before implementing the process of FIG. 2, in accordance with embodiments of the present invention. FIG. 6 illustrates a simulated screen shot of a modeling tool that models DSL Provisioning flow 600. DSL Provisioning flow 600 includes the steps discussed below.

In step 601, the provisioning system receives a customer order from a CRM system. The received customer order includes product items. The provisioning system stores the product items in a repository of product items 602.

A while loop 603 includes the steps 604, 606, 608, 610, 612, 614, 616, 618, 620, 622, 624, 626, 628, 630 and 634. While loop 603 starts at step 604.

In step 606, the provisioning system validates a product ID of a product included in the customer order received in step 601.

In step 608, the provisioning system determines whether the product ID is valid for DSL provisioning. If the product ID is determined in step 608 to be valid, then the Yes branch of step 608 is followed and step 610 is performed.

In step 610, the provisioning system performs a sub-process that allocates a DSLAM port for the DSL service being provisioned.

In step 612, the provisioning system performs a sub-process that allocates a telephone number to the DSL service being provisioned.

In step 614, the provisioning system performs a sub-process that allocates a modem to the DSL service being provisioned.

In step 616, the provisioning system performs dispatch logistics for the DSL service being provisioned.

In step 618, the provisioning system allocates field resources for the DSL service being provisioned.

In step 620, the provisioning system performs the installation of the DSL service being provisioned.

In step 622, the provisioning system tests resources for the DSL service being provisioned.

In step 624, the provisioning system activates resources for the DSL service being provisioned.

In step 626, the provisioning system activates the DSL service.

In step 628, the provisioning system updates a billing system to include the activated DSL service and updates the CRM system to indicate that the order for the DSL service is fulfilled.

After step 628, the loop beginning at step 604 iterates again if there is another product in the customer order that needs to be provisioned. In step 630, the while loop that began at step 604 ends. Following the end of the while loop, the process of FIG. 6 ends.

Returning to step 608, if the product ID is determined to be not valid for DSL provisioning, then the No branch of step 608 is followed and step 634 is performed.

In step 634, the provisioning system does not currently provision the product. Following step 634, the loop beginning at step 604 iterates again if there is another product in the customer order that needs to be provisioned. In step 630, the while loop ends and the process of FIG. 6 ends.

The three allocation sub-processes Allocate DSLAM Port, Allocate Number, and Allocate Modem (see steps 610, 612 and 614, respectively) are the same, but need to be modified sequentially to represent three different categories of resources.

If in the future, the Allocate Modem sub-process (see step 614) needs to allocate "Modem" as well as "Modem Spares," then another sub-process needs to be added to flow 600.

Figure 7:
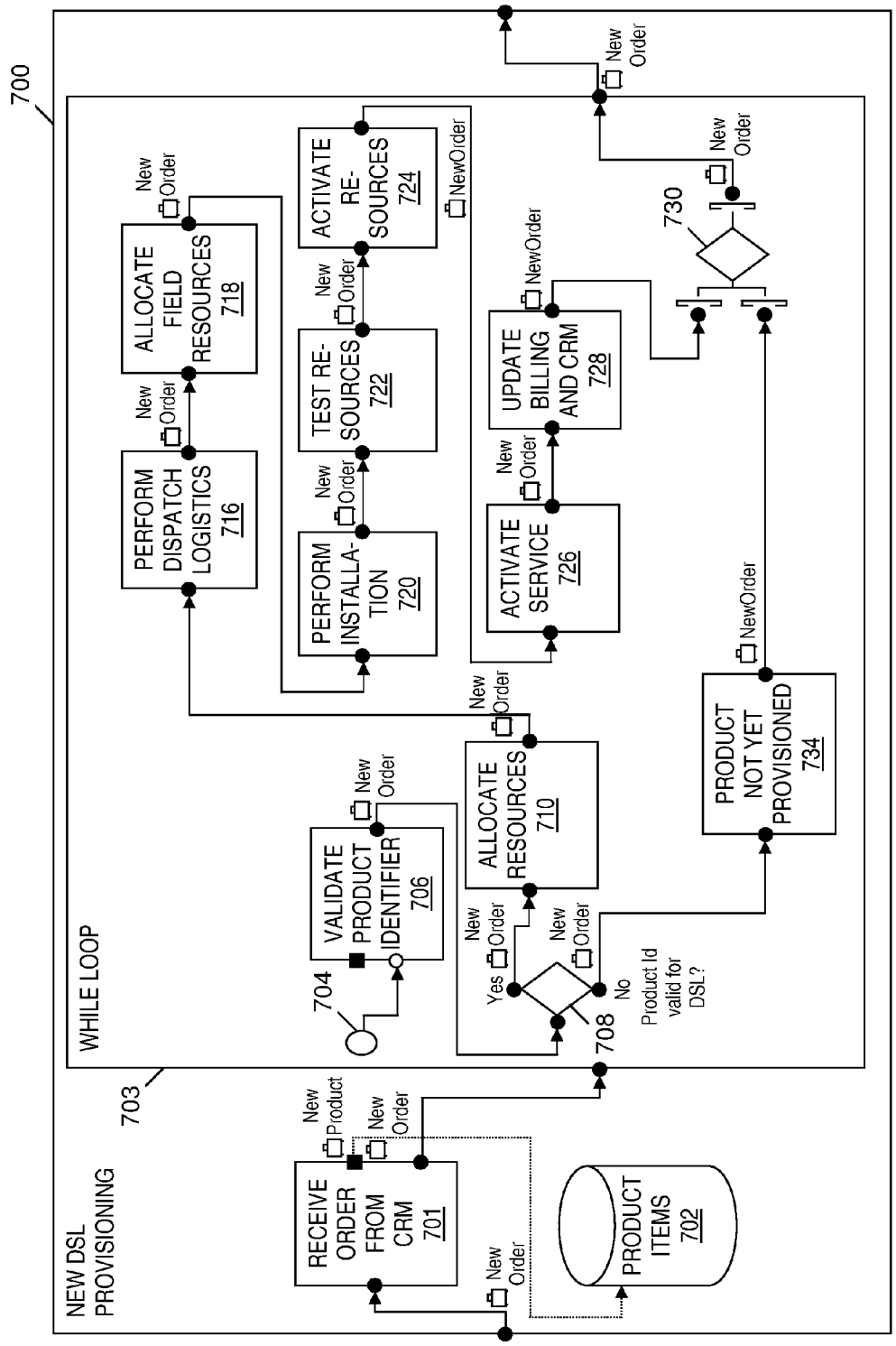
FIG. 7 depicts an exemplary display of a modeling tool that models the DSL provisioning process flow of FIG. 5 after implementing the process of FIG. 2, in accordance with embodiments of the present invention.

FIG. 7 depicts an exemplary display of a modeling tool that models the DSL provisioning process flow of FIG. 5 after implementing the process of FIG. 2, in accordance with embodiments of the present invention. FIG. 7 illustrates a simulated screen shot of a modeling tool that models DSL Provisioning flow 700, which represents DSL provisioning after the implementation of BPMA 106 (see FIG. 1). DSL Provisioning flow 700 includes the steps discussed below.

In step 701, the provisioning system receives a customer order from a CRM system. The received customer order includes product items. The provisioning system stores the product items in a repository of product items 702.

A while loop 703 includes the steps 704, 706, 708, 710, 712, 714, 716, 718, 720, 722, 724, 726, 728, 730 and 734. While loop 703 starts at step 704.

In step 706, the provisioning system validates a product ID of a product included in the customer order received in step 701.

In step 708, the provisioning system determines whether the product ID is valid for DSL provisioning. If the provisioning system determines in step 708 that the product ID is valid for DSL provisioning, then the Yes branch of step 708 is followed and step 710 is performed.

In step 710, the provisioning system performs a sub-process that allocates resources. for the DSL service being provisioned. BPMA 106 (see FIG. 1) provides the following dynamic categories for the sub-process performed in step 710:

DSLAM Port—mapped to the Allocate DSLAM Port sub-process of the base process

Number—mapped to the Allocate Number sub-process of the base process

Modem—mapped to the Allocate Modem sub-process of the base process

If FIG. 7 represents the DSL provisioning flow that improves the flow of FIG. 6 as modified by adding a "Modem Spares" sub-process, then the dynamic category Modem is hierarchical and has the following sub-categories:

Modem—mapped to the Allocate Modem sub-process

Modem Spares—mapped to the Allocate Modem Spares sub-process

In step 716, the provisioning system performs dispatch logistics for the DSL service being provisioned.

In step 718, the provisioning system allocates field resources for the DSL service being provisioned.

In step 720, the provisioning system performs the installation of the DSL service being provisioned.

In step 722, the provisioning system tests resources for the DSL service being provisioned.

In step 724, the provisioning system activates resources for the DSL service being provisioned.

In step 726, the provisioning system activates the DSL service.

In step 728, the provisioning system updates a billing system to include the activated DSL service and updates the CRM system to indicate that the order for the DSL service is fulfilled.

After step 728, the loop beginning at step 704 iterates again if there is another product in the customer order that needs to be provisioned. In step 730, the while loop that began at step 704 ends. Following the end of the while loop, the process of FIG. 7 ends.

Returning to step 708, if the provisioning system determines that the product ID is not valid for DSL provisioning, then the No branch of step 708 is followed and step 734 is performed.

In step 734, the provisioning system does not currently provision the product. Following step 734, the loop beginning at step 704 iterates again if there is another product in the customer order that needs to be provisioned. In step 730, the while loop ends and the process of FIG. 7 ends.

Figure 8:
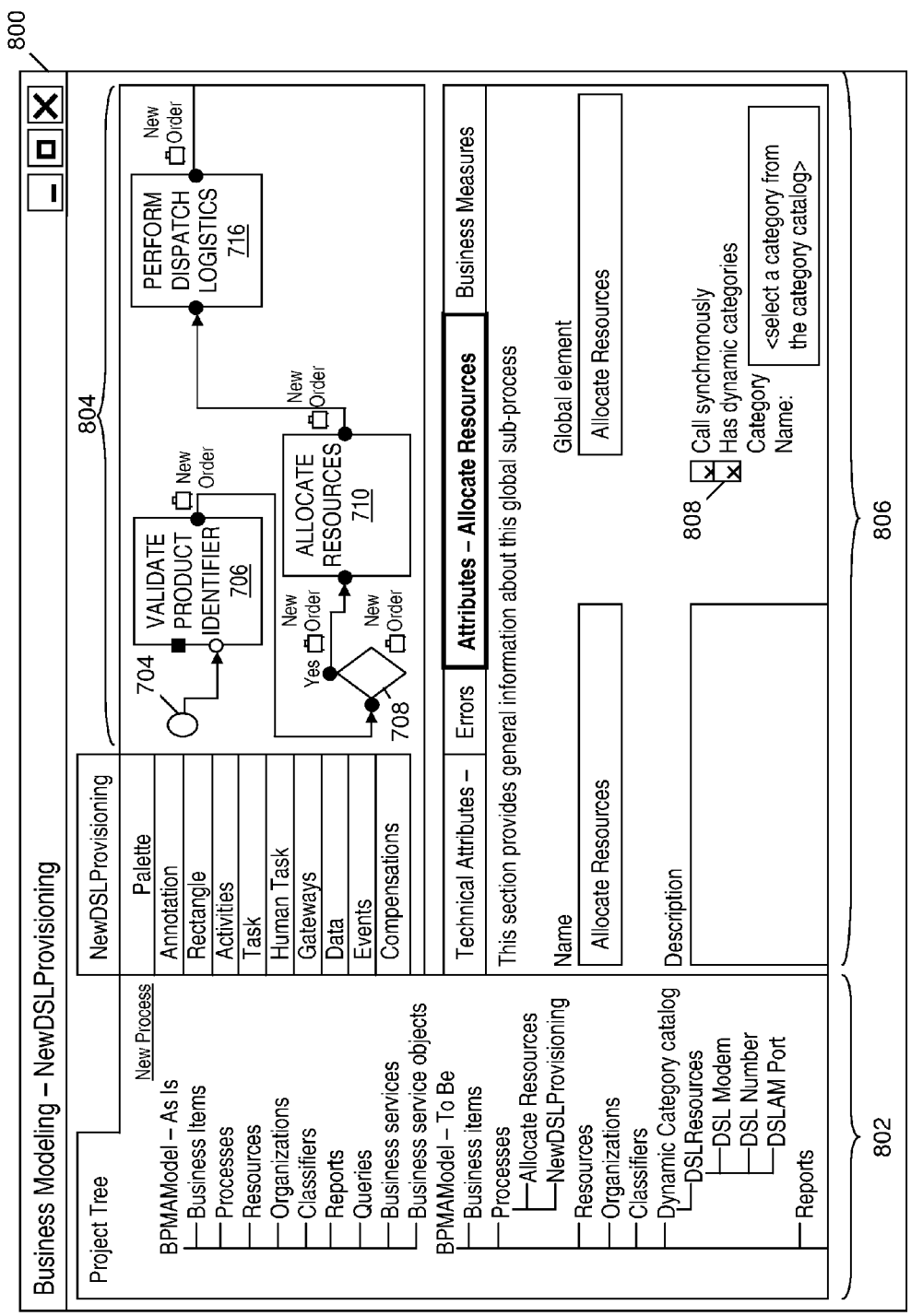
FIG. 8 depicts an interface for editing a process flow, where a portion of the exemplary process flow of FIG. 5 is shown in an editing canvas as a result of editing the exemplary process flow of FIG. 3, in accordance with embodiments of the present invention.

FIG. 8 depicts an interface for editing a process flow, where a portion of the exemplary process flow of FIG. 5 is shown in an editing canvas as a result of editing the exemplary process flow of FIG. 3, in accordance with embodiments of the present invention.

Interface 800 provided by BPMA 106 includes a project tree 802, a process editor canvas 804, and an Attributes view 806. In response to a global sub-process being dragged and dropped onto process editor canvas 804 (or in response to a task being converted to a global sub-process), BPMA 106 (see FIG. 1) displays a prompt (not shown) to the process author to ask whether the global sub-process needs to be configured for dynamic categories (i.e., has a potential for changes in the future). If the process author indicates "Yes" that the global sub-process needs to be configured for dynamic categories, then a checkbox 808 labeled "Has dynamic categories" is checked in the Attributes view 806 for the process being edited in process editor canvas 804. In interface 800, the sub-process Allocate Resources 710 is being edited in process editor canvas 804. Checkbox 808 is checked, indicating that the Allocate Resources sub-process is configured for dynamic categories. Below checkbox 808 is a select box, which allows the process author to browse and select a dynamic category created for sub-process Allocate Resources 710.

Defining a Catalog for Dynamic Categories

In Project Tree 802, a project indicated on the left-hand side of interface 800 has a catalog for dynamic categories. The process author defines a new category (e.g., DSL Resources) in project tree 802 and subsequently defines various category values within the new category. In Project Tree 802, the dynamic category "DSL Resources" has three category values: DSLAM Port, DSL Modem and DSL Number.

Defining Dynamic Categories and the Sub-Processes to which the Dynamic Categories Map For each dynamic category value, the process author can specify an attribute that indicates the type of the dynamic category indicated by the dynamic category value (i.e., indicates whether the dynamic category or sub-category within the category is simple or hierarchical). Along with type, the process author can also specify the global sub-process that the dynamic category or sub-category within the category needs to invoke. For example, the dynamic categories DSLAM Port and DSL Number are of the "simple" type; therefore each of them invokes the corresponding "Allocate Resources" sub-process once in the baseline DSL provisioning process. On the other hand, the category "DSL Modem" is of the "hierarchical" type, as shown in FIG. 9

FIG. 9 depicts an interface for defining dynamic categories and their attributes for use in the process of FIG. 2 applied to the exemplary process flow of FIG. 4, in accordance with embodiments of the present invention. Interface 900 allows a process author to define the attributes of a dynamic category value. In the example shown in FIG. 9, attributes of the DSL Modem category are defined in interface 900. Interface 900 includes an indication that the type of the DSL Modem category is hierarchical (i.e., a radio button for "Hierarchical" is selected). Furthermore, interface 900 includes fields labeled "Process Invoked" for entering an identifier of a global sub-process that is invoked for "Main modem" and an identifier of a global sub-process that is invoked for "Modem spares." "Main modem" and "Modem spares" are the different types of business context specified for the hierarchy of the DSL Modem category. For example, if the sub-process "Allocate Resources" (i.e., an identifier for Allocate Resources 710 in FIG. 7) is entered in the "Process Invoked" fields for "Main modem" and for "Modem spares," then the Allocate Resources sub-process 710 (see FIG. 7) is invoked once for Main modem and once for Modem spares. The "Allocate Resources" sub-process is invoked multiple times depending on the category chosen.

If in the future a new type of resource is added or if there is a third type of Modem accessory apart from Main modem and Modem spares, then the process author needs to change the categories and corresponding sub-process identifiers in the catalog and the original DSL provisioning process model remains intact with no change. DSL provisioning thus becomes the main baseline process for the complete order fulfillment system.

When a process model specified by BPMA 106 (see FIG. 1) is exported to an implementation tool such as WID, appropriate interfaces must be called in the BPEL sequentially based on the category, type hierarchy and the process model chosen to be invoked.

In one embodiment, the process author applies the flexible modeling primitives provided by BPMA 106 (see FIG. 1) for all sub-processes that the process author determines as having a potential to be extended or modified in the future. The flexible modeling primitives may be applied to all sub-processes within a process hierarchy as per the convenience of the process author.

The dynamic category configuration provided by BPMA 106 (see FIG. 1) allows the process author either to call the same sub-process with a changed business context, or to specify a different global sub-process to be invoked with a changing business context.

Computer System

Figure 10:
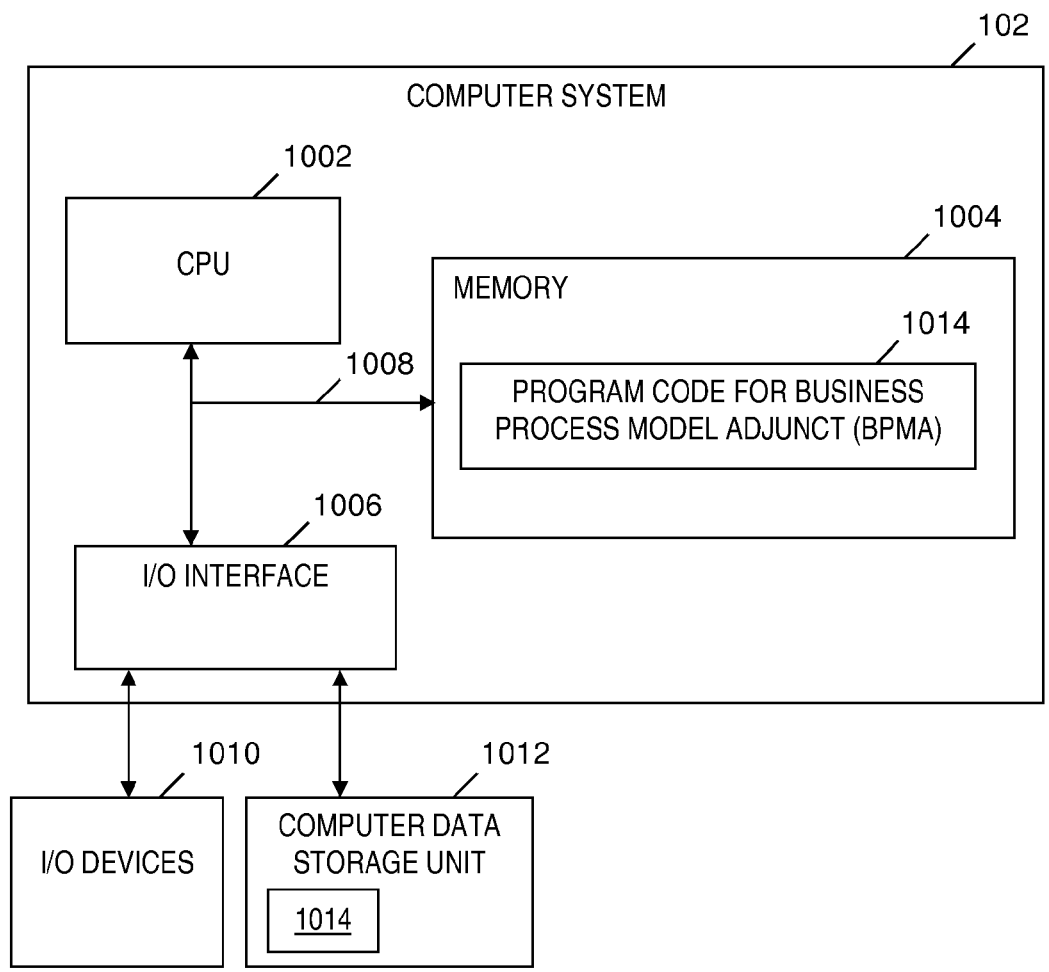
FIG. 10 is a block diagram of a computer system that is included in the system of FIG. 1 and that implements the process of FIG. 2, in accordance with embodiments of the present invention.

FIG. 10 is a block diagram of a computer system that is included in the system of FIG. 1 and that implements the process of FIG. 2, in accordance with embodiments of the present invention. Computer system 102 generally comprises a central processing unit (CPU) 1002, a memory 1004, an input/output (I/O) interface 1006, and a bus 1008. Further, computer system 102 is coupled to I/O devices 1010 and a computer data storage unit 1012. CPU 1002 performs computation and control functions of computer system 102, including carrying out instructions included in program code 1014 to perform a method of specifying a reusable process model, where the instructions are carried out by CPU 1002 via memory 1004. CPU 1002 may comprise a single processing unit, or be distributed across one or more processing units in one or more locations (e.g., on a client and server). In one embodiment, program code 1014 includes code for modules 106 in FIG. 1.

Memory 1004 may comprise any known computer-readable storage medium, which is described below. In one embodiment, cache memory elements of memory 1004 provide temporary storage of at least some program code (e.g., program code 1014) in order to reduce the number of times code must be retrieved from bulk storage while instructions of the program code are carried out. Moreover, similar to CPU 1002, memory 1004 may reside at a single physical location, comprising one or more types of data storage, or be distributed across a plurality of physical systems in various forms. Further, memory 1004 can include data distributed across, for example, a local area network (LAN) or a wide area network (WAN).

I/O interface 1006 comprises any system for exchanging information to or from an external source. I/O devices 1010 comprise any known type of external device, including a display device (e.g., monitor), keyboard, mouse, printer, speakers, handheld device, facsimile, etc. Bus 1008 provides a communication link between each of the components in computer system 102, and may comprise any type of transmission link, including electrical, optical, wireless, etc.

I/O interface 1006 also allows computer system 102 to store information (e.g., data or program instructions such as program code 1014) on and retrieve the information from computer data storage unit 1012 or another computer data storage unit (not shown). Computer data storage unit 1012 may comprise any known computer-readable storage medium, which is described below. For example, computer data storage unit 1012 may be a non-volatile data storage device, such as a magnetic disk drive (i.e., hard disk drive) or an optical disc drive (e.g., a CD-ROM drive which receives a CD-ROM disk).

Memory 1004 and/or storage unit 1012 may store computer program code 1014 that includes instructions that are carried out by CPU 1002 via memory 1004 to specify a reusable process model. Although FIG. 10 depicts memory 1004 as including program code 1014, the present invention contemplates embodiments in which memory 1004 does not include all of code 1014 simultaneously, but instead at one time includes only a portion of code 1014.

Further, memory 1004 may include other systems not shown in FIG. 10, such as an operating system (e.g., Linux) that runs on CPU 1002 and provides control of various components within and/or connected to computer system 102.

Storage unit 1012 and/or one or more other computer data storage units (not shown) that are coupled to computer system 102 may store a catalog of dynamic categories 108 (see FIG. 1) and the attributes of the dynamic categories.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 1004 and/or computer data storage unit 1012) having computer-readable program code (e.g., program code 1014) embodied or stored thereon.

Any combination of one or more computer-readable mediums (e.g., memory 1004 and computer data storage unit 1012) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 1014) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1014) embodied on a computer-readable medium may be transmitted using any appropriate medium, including but not limited to wireless, wireline, optical fiber cable, RF, etc., or any suitable combination of the foregoing.

Computer program code (e.g., program code 1014) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 10. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1 and FIG. 10), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1014). These computer program instructions may be provided to one or more hardware processors (e.g., CPU 1002) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 1004 or computer data storage unit 1012) that can direct a computer (e.g., computer system 102), other programmable data processing apparatus, or other devices to function in a particular manner, such that the instructions (e.g., program 1014) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 1014) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to specifying a reusable process model. Thus, an embodiment of the present invention discloses a process for supporting computer infrastructure, wherein the process comprises providing at least one support service for at least one of integrating, hosting, maintaining and deploying computer-readable code (e.g., program code 1014) in a computer system (e.g., computer system 102) comprising one or more processors (e.g., CPU 1002), wherein the processor(s) carry out instructions contained in the code causing the computer system to specify a reusable process model.

In another embodiment, the invention provides a method that performs the process steps of the invention on a subscription, advertising and/or fee basis. That is, a service provider, such as a Solution Integrator, can offer to create, maintain, support, etc. a process of specifying a reusable process model. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIG. 2 and the block diagrams in FIG. 1 and FIG. 10 illustrate the architecture, functionality, and operation of possible implementations of systems, methods, and computer program products according to various embodiments of the present invention. In this regard, each block in the flowchart or block diagrams may represent a module, segment, or portion of code (e.g., program code 1014), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of specifying a reusable process model, the method comprising the steps of:
   a computer receiving an indication that one or more sub-processes of a base process have a potential for being modified;
   based on the received indication that the one or more sub-processes of the base process have the potential for being modified, the computer applying a corresponding configurable pattern to each sub-process, wherein applying the corresponding configurable pattern includes applying a configurable pattern to a sub-process of the one or more sub-processes;
   the computer filling in the configurable pattern with values that indicate a mapping of one or more dynamic categories to the sub-process, wherein the mapping is included in a business context;
   the computer receiving an indication of a change to business requirements on which the base process is based; and
   based on the received indication of the change to the business requirements, the computer receiving a change to the values filled in the configurable pattern without requiring a change to the base process.

2. The method of claim 1, wherein the step of receiving the change to the values filled in the configurable pattern includes:
   receiving a new business context that includes a new mapping of a new dynamic category to the sub-process; and
   subsequent to receiving the new business context, invoking the sub-process for the new business context and invoking the sub-process for the business context.

3. The method of claim 1, wherein the step of receiving the change to the values filled in the configurable pattern includes:
   receiving a new sub-process for the business context that includes the mapping of the one or more dynamic categories to the sub-process; and
   invoking the new sub-process for the business context, without requiring the change to the base process.

4. The method of claim 1, wherein the step of receiving the change to the values filled in the configurable pattern includes:
   receiving a new sub-process for a new business context that includes a new mapping of a new dynamic category to a new sub-process; and
   invoking the new sub-process for the new business context instead of invoking the new sub-process for the business context, and without requiring the change to the base process.

5. The method of claim 1, further comprising the step of the computer reusing the sub-process in a specification of another reusable process model, based on the sub-process not being directly linked to the base process so that a change to the base process does not affect the sub-process, wherein the sub-process not being directly linked to the base process is based on the configurable pattern applied to the sub-process.

6. The method of claim 1, wherein the step of filling in the configurable pattern with the values that indicate the mapping of the one or more dynamic categories to the sub-process includes filling in the configurable pattern during modeling time and not at runtime.

7. The method of claim 1, further comprising the step of the computer receiving an attribute indicating the category is of a type indicating a hierarchy including at least first and second sub-categories of the category,
   wherein filling in the configurable pattern with values includes filling in the configurable pattern with a first value indicating a first mapping of the first sub-category to the sub-process of the one or more sub-processes, and with a second value indicating a second mapping of the second sub-category to the sub-process of the one or more sub-processes, and
   wherein receiving the change to the values filled in the configurable pattern without requiring a change to the base process includes receiving a change to the first mapping or the second mapping.

8. The method of claim 1, further comprising the step of the computer receiving an attribute indicating the category is of a type indicating a hierarchy including at least first and second sub-categories of the category, wherein filling in the configurable pattern with values includes filling in the configurable pattern with a first value indicating a first mapping of the first sub-category to the sub-process of the one or more sub-processes, and with a second value indicating a second mapping of the second sub-category to another sub-process of the one or more sub-processes, and wherein receiving the change to the values filled in the configurable pattern without requiring a change to the base process includes receiving a change to the first mapping or the second mapping.

9. A computer system comprising:

a central processing unit (CPU);

a memory coupled to the CPU;

a computer-readable, tangible storage device coupled to the CPU, the storage device containing instructions that are carried out by the CPU via the memory to implement a method of specifying a reusable process model, the method comprising the steps of:

the computer system receiving an indication that one or more sub-processes of a base process have a potential for being modified;

based on the received indication that the one or more sub-processes of the base process have the potential for being modified, the computer system applying a corresponding configurable pattern to each sub-process, wherein applying the corresponding configurable pattern includes applying a configurable pattern to a sub-process of the one or more sub-processes;

the computer system filling in the configurable pattern with values that indicate a mapping of one or more dynamic categories to the sub-process, wherein the mapping is included in a business context;

the computer system receiving an indication of a change to business requirements on which the base process is based; and based on the received indication of the change to the business requirements, the computer system receiving a change to the values filled in the configurable pattern without requiring a change to the base process.

10. The computer system of claim 9, wherein the step of receiving the change to the values filled in the configurable pattern includes:

receiving a new business context that includes a new mapping of a new dynamic category to the sub-process; and subsequent to receiving the new business context, invoking the sub-process for the new business context and invoking the sub-process for the business context.

11. The computer system of claim 9, wherein the step of receiving the change to the values filled in the configurable pattern includes:

receiving a new sub-process for the business context that includes the mapping of the one or more dynamic categories to the sub-process; and invoking the new sub-process for the business context, without requiring the change to the base process.

12. The computer system of claim 9, wherein the step of receiving the change to the values filled in the configurable pattern includes:

receiving a new sub-process for a new business context that includes a new mapping of a new dynamic category to a new sub-process; and invoking the new sub-process for the new business context instead of invoking the new sub-process for the business context, and without requiring the change to the base process.

13. A computer program product, comprising a computer-readable, tangible storage device, that is not a signal, having a computer-readable program code stored therein, the computer-readable program code containing instructions that are carried out by a central processing unit (CPU) of a computer system to implement a method of specifying a reusable process model, the method comprising the steps of:

the computer system receiving an indication that one or more sub-processes of a base process have a potential for being modified;

based on the received indication that the one or more sub-processes of the base process have the potential for being modified, the computer system applying a corresponding configurable pattern to each sub-process, wherein applying the corresponding configurable pattern includes applying a configurable pattern to a sub-process of the one or more sub-processes;

the computer system filling in the configurable pattern with values that indicate a mapping of one or more dynamic categories to the sub-process, wherein the mapping is included in a business context;

the computer system receiving an indication of a change to business requirements on which the base process is based; and based on the received indication of the change to the business requirements, the computer system receiving a change to the values filled in the configurable pattern without requiring a change to the base process.

14. The program product of claim 13, wherein the step of receiving the change to the values filled in the configurable pattern includes:

receiving a new business context that includes a new mapping of a new dynamic category to the sub-process; and subsequent to receiving the new business context, invoking the sub-process for the new business context and invoking the sub-process for the business context.

15. The program product of claim 13, wherein the step of receiving the change to the values filled in the configurable pattern includes:

receiving a new sub-process for the business context that includes the mapping of the one or more dynamic categories to the sub-process; and invoking the new sub-process for the business context, without requiring the change to the base process.

16. The program product of claim 13, wherein the step of receiving the change to the values filled in the configurable pattern includes:

receiving a new sub-process for a new business context that includes a new mapping of a new dynamic category to a new sub-process; and invoking the new sub-process for the new business context instead of invoking the new sub-process for the business context, and without requiring the change to the base process.

17. A process for supporting computing infrastructure, the process comprising providing at least one support service for at least one of creating, integrating, hosting, maintaining, and deploying computer-readable code in a computer system comprising a processor, wherein the processor carries out instructions contained in the code causing the computer system to perform a method of specifying a reusable process model, wherein the method comprises the steps of:

the computer system receiving an indication that one or more sub-processes of a base process have a potential for being modified;

based on the received indication that the one or more sub-processes of the base process have the potential for being modified, the computer system applying a corresponding configurable pattern to each sub-process, wherein applying the corresponding configurable pattern includes applying a configurable pattern to a sub-process of the one or more sub-processes;

the computer system filling in the configurable pattern with values that indicate a mapping of one or more dynamic categories to the sub-process, wherein the mapping is included in a business context;

the computer system receiving an indication of a change to business requirements on which the base process is based; and based on the received indication of the change to the business requirements, the computer system receiving a change to the values filled in the configurable pattern without requiring a change to the base process.

18. The process of claim 17, wherein the step of receiving the change to the values filled in the configurable pattern includes:

receiving a new business context that includes a new mapping of a new dynamic category to the sub-process; and subsequent to receiving the new business context, invoking the sub-process for the new business context and invoking the sub-process for the business context.

19. The process of claim 17, wherein the step of receiving the change to the values filled in the configurable pattern includes:

receiving a new sub-process for the business context that includes the mapping of the one or more dynamic categories to the sub-process; and invoking the new sub-process for the business context, without requiring the change to the base process.

20. The process of claim 17, wherein the step of receiving the change to the values filled in the configurable pattern includes:

receiving a new sub-process for a new business context that includes a new mapping of a new dynamic category to a new sub-process; and invoking the new sub-process for the new business context instead of invoking the new sub-process for the business context, and without requiring the change to the base process.

* * * * *